(12) United States Patent
Maarefi (10) Patent No.: US 11,211,972 B2
(45) Date of Patent: Dec. 28, 2021

(54) HIGH SPEED SERIALIZER-DESERIALIZER SYSTEMS AND METHODS

(71) Applicant: SERNAI Networks, Inc., Morgan Hill, CA (US)

(72) Inventor: Hassan Maarefi, San Jose, CA (US)

(73) Assignee: SERNAI NETWORKS, INC., Morgan Hill, CA (US)

( * ) Notice: Subject to any disclaimer, the term of this patent is extended or adjusted under 35 U.S.C. 154(b) by 0 days.

(21) Appl. No.: 16/836,510

(22) Filed: Mar. 31, 2020

(65) Prior Publication Data

US 2020/0313720 A1    Oct. 1, 2020

Related U.S. Application Data

(60) Provisional application No. 62/827,514, filed on Apr. 1, 2019.

(51) Int. Cl.
*H04B 3/04*    (2006.01)
*H04B 3/50*    (2006.01)

(52) U.S. Cl.
CPC ............... *H04B 3/04* (2013.01); *H04B 3/50* (2013.01)

(58) Field of Classification Search
CPC .................................... H04B 3/04; H04B 3/05
See application file for complete search history.

(56) References Cited

U.S. PATENT DOCUMENTS

| | | | |
|---|---|---|---|
| 2007/0147491 A1* | 6/2007 | Casper | H04L 25/03885 375/232 |
| 2007/0230553 A1* | 10/2007 | Talbot | H04L 25/03878 375/229 |
| 2011/0222594 A1* | 9/2011 | Zerbe | H04L 25/03343 375/233 |
| 2014/0369399 A1* | 12/2014 | Nagase | H04L 25/0264 375/232 |
| 2015/0110165 A1* | 4/2015 | Ramadoss | H04L 25/03343 375/233 |

OTHER PUBLICATIONS

Raghavan, et al., "A Sub-2 W 39.8-44.6 Gb/s Transmitter and Receiver Chipset With SFI-5.2 Interface in 40 nm CMOS", IEEE International Solid-State Circuits Conference, 2013, 10 pages.
Cui, et al., "A Dual 23 Gb/s CMOS Transmitter/Received Chipset for 40 GB/s RZ-DQPSK and CS-RZ-DQPSK Optical Transmission", IEEE International Solid-State Circuits Conference, 2012, 3 pages.
Nazemi, et al. "A 2.8 mW/Gb/s Quad-Channel 8.5-11.4 Gb/s Quasi-Digital Transceiver in 28 nm CMOS", VLSI Symposia, 2013, 2 pages.

* cited by examiner

*Primary Examiner* — Dac V Ha
(74) *Attorney, Agent, or Firm* — Fountainhead Law Group P.C.

(57) ABSTRACT

A wired communication system includes a bidirectional channel for sending information in one direction at a high bandwidth and sending control information for configuring a transmitter in the other direction at a lower bandwidth. Embodiments of the disclosure may use a primary transmitter output stage in the transmitter and a primary receiver input stage in the receiver to send and receive data or a clock, for example. An auxiliary transmitter output stage in the receiver and auxiliary receiver input stage in the transmitter send and receive control information for configuring the transmitter to efficiently send data over a wired channel.

20 Claims, 8 Drawing Sheets

Fig. 13 ial Patent Application Ser. No. 62/827,514, filed on Apr. 1, 2019, entitled "High Speed Serializer-Deserializer Systems and Methods," the entire disclosure of which is hereby incorporated herein by reference.

HIGH SPEED SERIALIZER-DESERIALIZER SYSTEMS AND METHODS

CROSS REFERENCE TO RELATED APPLICATIONS

This application claims the benefit of priority to U.S. Provisional Patent Application Ser. No. 62/827,514, filed on Apr. 1, 2019, entitled "High Speed Serializer-Deserializer Systems and Methods," the entire disclosure of which is hereby incorporated herein by reference.

BACKGROUND

The present disclosure pertains to data communications, and in particular, to high speed serializer and deserializer systems, methods, and circuits.

Processing digital information has become ubiquitous in the modern age. Data is typically stored as digital data (e.g., 0s and 1s). Such data is moved between systems at ever increasing speeds. As the rate of data movement increases, the medium (or channel) used to move the data is an issue of ever-increasing importance. For example, at very high speeds, a data communication channel may distort the data signal. Such distortions may result in the data being lost during transmission.

Accordingly, discovering circuits, systems, and methods for efficiently communicating data over a communication channel at very high speeds would be highly advantageous.

BRIEF DESCRIPTION OF THE DRAWINGS

With respect to the discussion to follow and in particular to the drawings, it is stressed that the particulars shown represent examples for purposes of illustrative discussion and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1A:
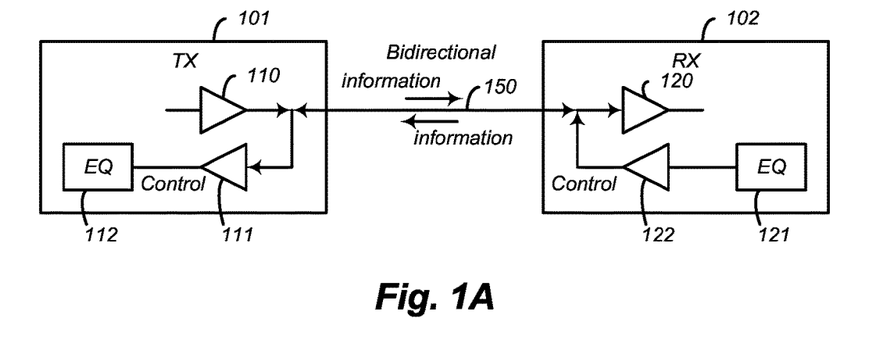
FIG. 1A illustrates a transmitter and receiver according to one embodiment.

FIG. 1A illustrates a transmitter and receiver according to one embodiment.

Features and advantages of the present disclosure include a wireline data communication system that uses a bidirectional communication channel for sending first information (e.g., data or a clock) in one direction, typically at a very high speed, and sending second information, such as control information, in the opposite direction to configure a transmitter sending the first information. FIG. 1A illustrates a transmitter 101 sending information to a receiver 102. Transmitter 101 may be part of a serializer system that receives digital bits and sends them over one or more wireline communication channels (e.g., wires) at very high speeds (e.g., up to and over 100 gigabits per second, Gbps). In some embodiments, the wired differential conductors have a length in the range of 1 mm to 50 cm for very high speed applications, for example, or up to about 1 meter (e.g., in an automotive application). Each transmitter 101 may include a transmitter output stage 110, which may comprise a high speed analog circuit for driving the channel, for example. Transmitter 101 is coupled to a receiver 102 over a bidirectional communication channel 150. Receiver 102 may be part of a deserializer system that receives digital bits serially (one at a time) over communication channel 150 at very high speeds. Each receiver 102 may include a receiver input stage 120, which may comprise a high speed analog receiver circuit for receiving analog signals from the channel, for example. As described in more detail below, transmitter 101 may send data or a clock to receiver 102. Additionally, the information sent between transmitter 101 and receiver 102 may be encoded using a variety coding schemes as described for various embodiments below. Typical systems may include many transmitters 101 and receivers 102 sending bits serially over a plurality of communication channels configured in parallel, for example.

A typical transmitter/receiver pair 101/102 may be configured to optimize data transmission over channel 150. For example, when transmitter output stage 110 drives a signal over channel 150, the signal may be distorted as it propagates from the output stage 110 to the input stage 120. Such distortion may limit the speed at which data may be transmitted. Accordingly, it may be advantageous to modify the signal being transmitted so that the received signal is cleaner and easier to receive and process. This may sometimes be referred to as channel equalization or predistortion, for example. Embodiments of the disclosure may send control information over bidirectional communication channel 150 from the receiver 102 to the transmitter 101. The control information may be used to configure transmitter 101 to perform the equalization process more effectively to improve the data rate, for example. The control information may be said to propagate over a "back channel" to configure the transmitter based on the distortion detected at the receiver, for example.

In various embodiments, control information may be sent at different times for different purposes. In one embodiment, data is sent at very high speed from Tx 101 to Rx 102 during an initial time period and then stopped. The received distorted data is analyzed on Rx 102 and control information may be sent back to Tx 101 while the forward data channel is off to configure the Tx 101 for continuous high speed data transmission, for example. In other embodiments, the control information may be sent over a back channel at the same time the first information is being sent over channel 150 from transmitter 101 to receiver 102 (e.g., simultaneously), for example. Accordingly, the communication channel 150 sending first information from transmitter 101 to receiver 102 and sending control information from receiver 102 to transmitter 101 may be shared. Control information may be sent periodically. For example, Rx 102 may monitor Rx 102 performance metrics (e.g., BER) and send updated configuration information, such as modified coefficients, to Tx 101 when system performance falls below one or more measured performance metrics. The new configuration information may result in improvement of the overall communication channel performance, for example.

In various embodiments, a bidirectional communication channel may be obtained using auxiliary transmitters and receivers as shown in FIG. 1A. For example, receiver 102 may include an auxiliary transmitter output stage 122 coupled to bidirectional wired communication channel 150. Likewise, transmitter 101 may include an auxiliary receiver input stage 111 coupled to bidirectional wired communication channel 150. In this example, receiver 102 and transmitter 101 further include equalizers ("EQ") 121 and 112, respectively. As described further below, equalizers may monitor the integrity of the signal being sent across a communication channel and process the signal to optimize the transmission (e.g., optimize a bit error rate ("BER")). Accordingly, the bidirectional wired communication channel 150 may couple first information (e.g., data or a clock) from a first transmitter output stage 110 to a first receiver input stage 120, and the bidirectional wired communication channel 150 may couple control information for configuring the transmitter 101 from the auxiliary transmitter output stage 122 to the auxiliary receiver input stage 111. In one embodiment, the control information comprises channel equalization information, for example. As described in more detail below, the control information may comprise digital filter coefficients, for example. Advantageously, the bidirectional wired communication channel 150 may couple the first information and the control information during the same time period, for example. In some example applications, the control information may be much smaller than the information sent from transmitter 101 to receiver 102. Accordingly, the first information (e.g., in the forward path) may be coupled over the bidirectional wired communications channel 150 at a first data rate (e.g., a very high data rate near or above 100 Gbps), and the control information (e.g., in the back channel or reverse path) may be coupled over the bidirectional wired communications channel 150 at a second data rate less than the first data rate (e.g., where the second data rate is around 100 kilobytes per second and the first data rate is around 100 Gbps). Furthermore, as describe below, the first information may be coupled over the channel 150 across a first range of frequencies and the control information may be coupled over the channel 150 across a second range of frequencies. The first range of frequencies is greater than, in frequency, the second range of frequencies. In one example embodiment, the second range of frequencies are near, in frequency, to zero frequency (e.g., near DC), for example.

Figure 1B:
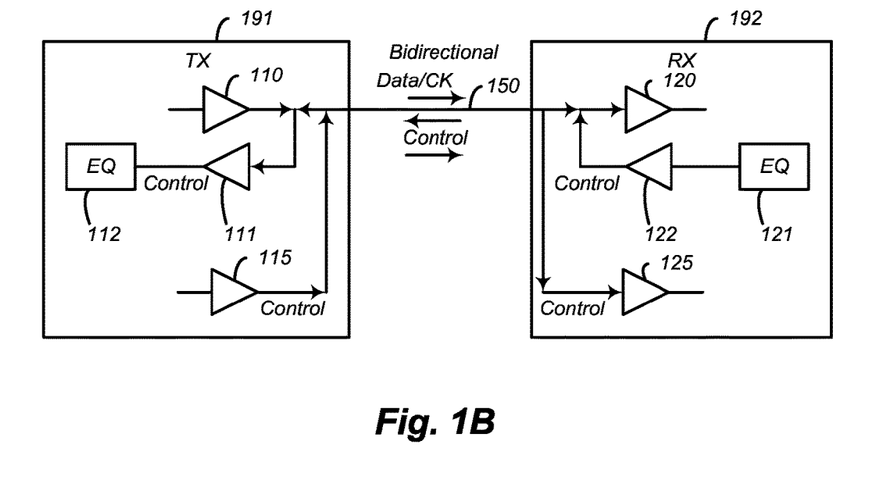
FIG. 1B illustrates a transmitter and receiver according to another embodiment.

FIG. 1B illustrates a transmitter and receiver according to another embodiment. In some embodiments, first information may be sent on a forward channel at very high speeds and a low speed back channel may send control information in both directions, for example. As illustrated in FIG. 1B, data or a clock, for example, may be sent on a forward channel from the transmitter 191 to the receiver 192 at Gbps speeds, while a bidirectional back channel may send control information from the receiver 192 to the transmitter 191 (as described above) as well as from the transmitter 191 to the receiver 192 at very low speeds relative to the forward channel, for example. Accordingly, in some embodiments, a transmitter 191 may further include an auxiliary transmitter 115 for sending control information to the receiver.

Similarly, receiver 192 may include an auxiliary receiver 125 for receiving control information. In the following embodiments, only the high speed forward channel and low speed back channel are shown. However, it is to be understood that the low speed back channel may, in some or all of the following embodiments, support the flow of control information in both directions between the transmitter and receiver, for example.

One example application of sending control information from the transmitter to the receiver over a low speed side channel may be as follows. Transmitter 191 may send data at very high speeds (e.g., up to or over 100 Gbps). However, the channel may cause severe distortion to the signal. In some embodiments, one or more data bits (e.g., a bit pattern) may be sent over both the high speed channel and the low speed side channel. The data sent over the low speed side channel may be far less distorted than the same data sent over the high speed channel. Accordingly, the distorted data received over the high speed channel may be compared to cleaner data received over the low speed channel. By comparing substantially known data to corresponding distorted data, the receiver may adaptively improve the reception process and BER, for example. In one embodiment, a neural network may be used to in an equalizer system in receiver 192 or transmitter 191, or both. The neural network may be trained using the data sent over the high speed and low speed channels to improve the system performance, for example. In other embodiments, an adaptive filter may modify filter coefficients in the receiver 192 or transmitter 191, or both, using the data sent over the high and low speed channels to improve system performance, for example.

Figure 2:
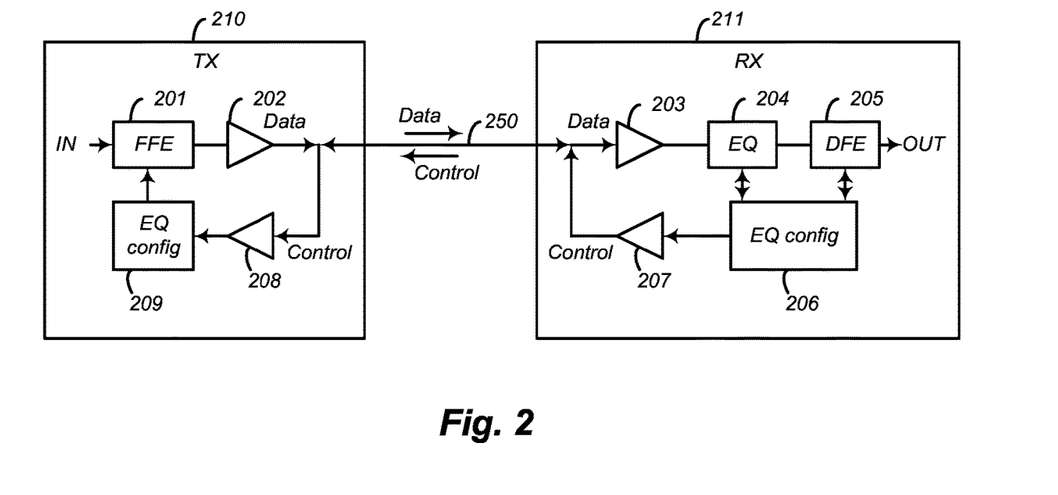
FIG. 2 illustrates an example transmitter and receiver according to one embodiment.

FIG. 2 illustrates an example transmitter and receiver according to one embodiment. In this example, data is sent from a transmitter to a receiver over a bidirectional wired communication channel 250 and control information is sent from the receiver to the transmitter over the channel 250. In this example, the transmitter 211 includes a first transmitter output stage 202 coupled to bidirectional wired communication channel 250 to send data. A receiver 211 includes a first receiver input stage 203 coupled to channel 250 to receive the data. An auxiliary transmitter output stage 207 in the receiver 211 and an auxiliary receiver input stage 208 in the transmitter 210 are coupled to bidirectional wired communication channel 250 to transmit and receive control information, respectively.

More specifically, in this example, transmitter 210 includes a feed forward equalizer 201. A feed forward equalizer (FFE) is a circuit component that corrects for at least some of the impact (e.g., distortion or attenuation) of the channel on the signal. For example, some FFE's may introduce high frequency peaking or other changes to the signal. An example FFE is described in more detail below. In this example, data is received in FFE 201 for conditioning. The output signal of FFE 221 is coupled to transmitter output stage 202, which may drive encoded digital data signals onto bidirectional wired communication channel 250. The data signals are received from the channel 250 at the input of a receiver input stage 203.

The receiver input stage 203 may amplify the signal and couple an amplified signal downstream to an equalizer circuit (EQ) 204 and decision feedback equalizer (DFE) 205 to produce an output (OUT). FFE 201, EQ 204, and DFE 205 may be configured in a coordinated manner to optimize transmission and reception, for example. Receiver 211 may include, for example, an equalizer configuration circuit 206 that monitors EQ 204 and/or DFE 205 and sends control information to FFE 201 over the back channel to configure FFE 201 to improve the transmission and reception of data signals, for example. Equalizer configuration circuit ("EQ config") 206 may generate control information ("Control") to be sent from auxiliary transmitter output stage 207 (encoders and other preprocessing circuits omitted for illustrative purposes) to auxiliary receiver input stage 208 over bidirectional wired communication channel 250, for example. The control information may be coupled to a transmitter equalizer configuration circuit ("EQ config") 209, which configures FFE 201 based on the control information generated by EQ config 206. EQ config 206 and EQ config 209 may not be the same circuits and functions, but they may be complementary in the sense that EQ config 206 monitors reception of the data signal and generates control information used by EQ config 209 to set up FFE 201 so that FFE 201, EQ 204, and DFE 205 optimize the transmission of data from transmitter 210 to receiver 211 (e.g., with a very low BER for the system). Advantageously, in some embodiments, data may be sent from transmitter 210 to receiver 211 at very high speeds over bidirectional channel 250 (e.g., over the forward channel) and control information may simultaneously be sent from receiver 211 to transmitter 210 (e.g., over the back channel) to optimize the channel and maintain very high data transmission rates.

Figure 3:
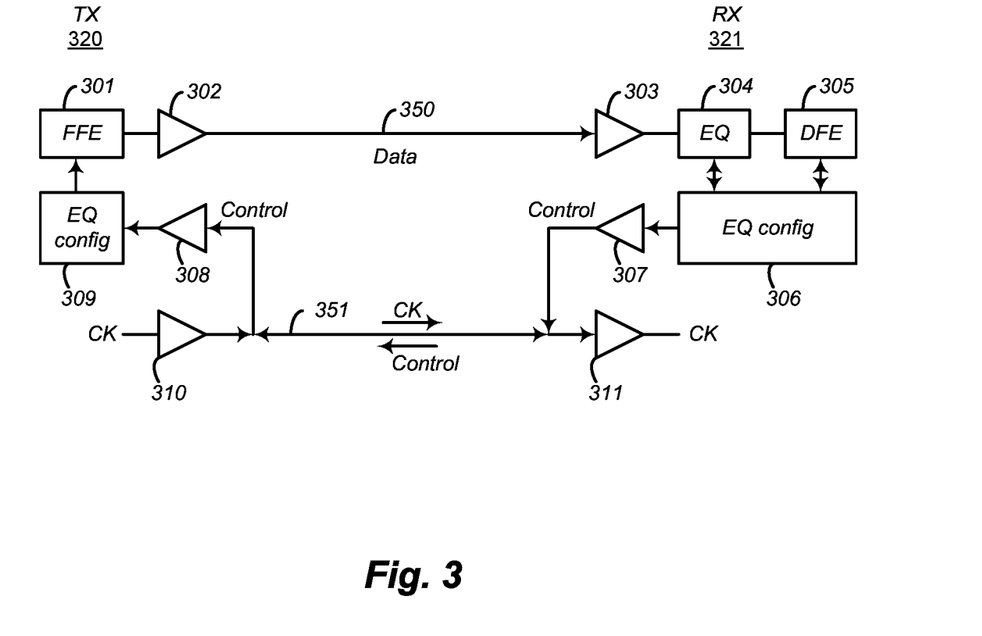
FIG. 3 illustrates another example transmitter and receiver according to one embodiment.

FIG. 3 illustrates another example transmitter and receiver according to one embodiment. In some applications, data may be sent from a transmitter to a receiver over one or more wired communication channels and a clock may be sent from the transmitter to the receiver over one or more other wired communication channels. This is sometimes referred to as clock forwarding. In such a system, the wired communication channel carrying the clock may be used for the back channel. For example, as illustrated in FIG. 3, a transmitter 320 includes a first transmitter output stage 310 coupled to bidirectional wired communication channel 351 to send a clock (CK), and a receiver 321 includes a first receiver input stage 311 coupled to the bidirectional wired communication channel 351 to receive the clock. In this case, an auxiliary transmitter output stage 307 is coupled to channel 351 to send control information and an auxiliary receiver input stage 308 is coupled to channel 351 to receive the control information. Transmitter 320 further includes transmitter output stage 302 coupled to a wired communication channel 350 for sending high speed data. Channel 350 may be a unidirectional channel (e.g., data only flows from Tx 320 to Rx 231), for example. Channel 350 is coupled to an input of receiver input stage 303 to receive the data. In this example, FFE 301, EQ 304, and DFE 305 are optimized by EQ config circuit 306 and 309 as describe above in connection with FIG. 2. However, control information generated by EQ config 306 is coupled to auxiliary transmitter 307 and over bidirectional channel 351 (e.g., which carries the clock signal) to auxiliary receiver 308 and then to EQ config 309.

Figure 4:
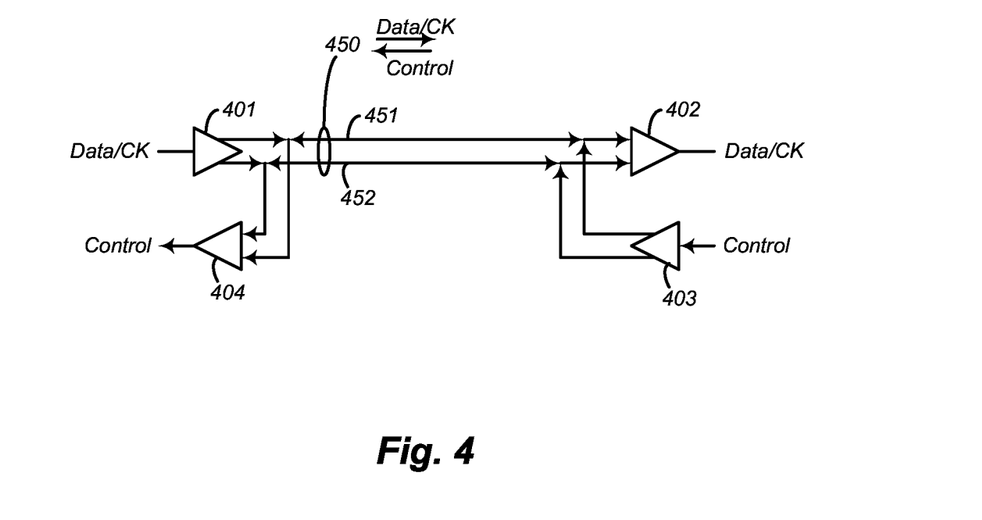
FIG. 4 illustrates an example differential wired communication channel according to one embodiment.

FIG. 4 illustrates an example differential wired communication channel 450 according to one embodiment. In this example, the transmitter output stage 401 and receiver input stage 402 send and receive, respectively, differential data or clock signals. Accordingly, each wired communication channel may comprise two wires 451 and 452, for example. Similarly, the auxiliary transmitter 403 and auxiliary receiver 404 send control information over a differential bidirectional wired communications channel comprising wires 451 and 452, for example.

Figure 5:
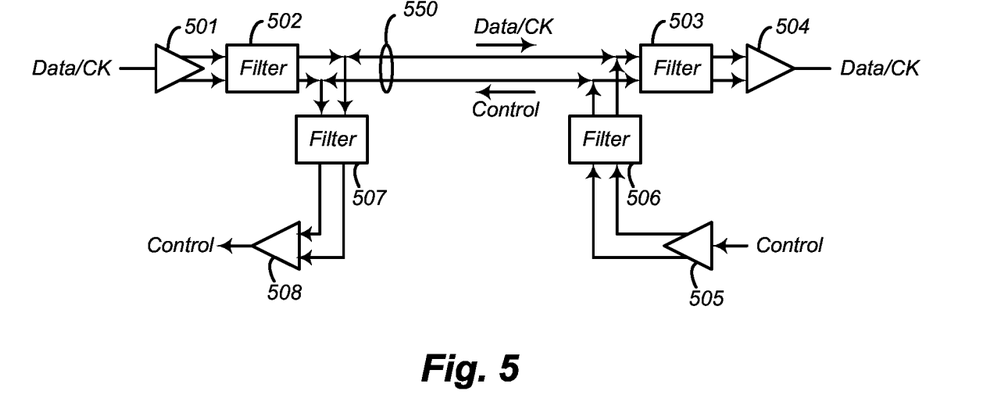
FIG. 5 illustrates an example implementation of a transmitter and receiver according to one embodiment.

FIG. 5 illustrates an example implementation of a transmitter and receiver according to one embodiment. In this example, a plurality of filters are used to route signals on the bidirectional wired communication channel 550 to appropriate inputs. For example, data or a clock, for example, may be coupled from the output of transmitter output stage 501 across channel 550 to the input of receiver 504. However, control information may be on channel 550 at the same time. As mentioned above, the data or clock signal in the forward channel may occupy different frequencies than the control information on the back channel (or side channel flowing in both directions per FIG. 1B). Accordingly, a frequency selective filter 503 may be used so that the frequencies carrying the data or clock are passed from channel 550 to receiver input stage 504. Filter 503 may attenuate the frequencies carrying the control information, for example. Similarly, a frequency selective filter 507 may be used so that the frequencies carrying the control information are passed from channel 550 to auxiliary receiver input stage 508. Filter 507 may attenuate the frequencies carrying the data or the clock, for example. In some embodiments, transmitter 501 and auxiliary transmitter 505 may be coupled through filter 502 and filter 506, respectively, to drive data/clock and control information signals, respectively, onto the channel 550. Filter 502 may pass frequencies carrying data or clock, and attenuate frequencies used for the control information. Similarly, filter 506 may pass frequencies carrying control information, and attenuate frequencies used for data or a clock, for example. Filters 502 and 506, if used, may also have the added advantageous effect of attenuating out of band noise to reduce the overall noise in channel 550, for example.

Figure 6A:
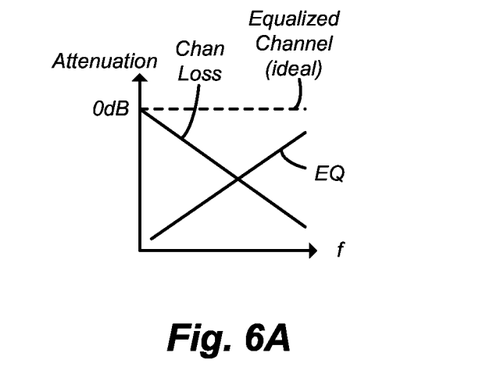
FIG. 6A illustrates channel equalization according to one embodiment.

FIG. 6A is a simplified illustration of channel equalization according to one embodiment. As illustrated in FIG. 6A, some wired communication channels may increasingly attenuate a signal as the signal frequency increases. This is sometimes referred to as channel loss. Accordingly, this variation in attenuation may distort the signal as the signal propagates from the transmitter to the receiver. Equalization may boost some frequencies more than others to cancel out the variable attenuation of the channel. The line designated EQ shows how different signal frequencies may be increased more than others in an attempt to cancel out the channel loss and obtain an equalized channel response closer to an ideal channel, for example.

Figure 6B:
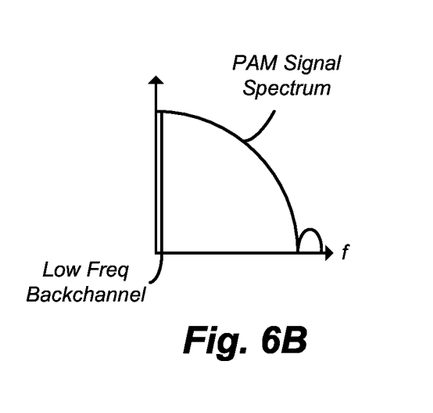
FIG. 6B illustrates a signal spectrum and backchannel frequency according to one embodiment.

FIG. 6B illustrates a signal spectrum and backchannel frequency according to one embodiment. In some embodiments, digital data may be sent across the channel using NRZ or pulse amplitude modulation ("PAM") encoding, where the signal spectrum may span a range of frequencies from zero up to the highest frequency (e.g., 20-50 GHz). In some embodiments, a small range of frequencies near zero frequency may be advantageously used for the back channel (or a side channel as mentioned in FIG. 1B). For example, the control information used to configure an FFE in a transmitter may not require a large amount of digital values. Accordingly, lower frequencies may be used to send the control information at a much lower data rate relative to the data rates required to send data or a clock on the forward channel. In some applications, a small range of frequencies above zero frequency up to about one hundred kilohertz (100 kHz) or a few hundred kHz may be used to send the control information over the back channel. Accordingly, substantially all the other frequencies may be available for sending nearly the full spectrum of the data signal or clock signal, for example.

Figure 6C:
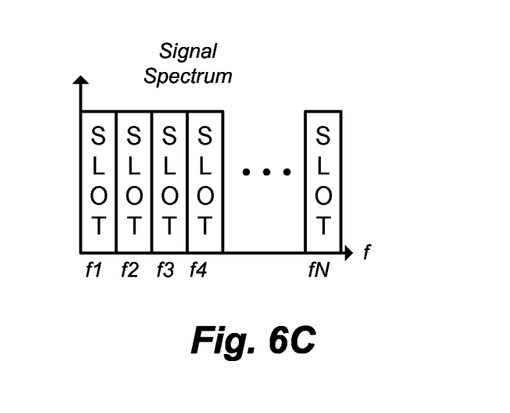
FIG. 6C illustrates another signal spectrum and backchannel according to one embodiment.

FIG. 6C illustrates another signal spectrum and backchannel according to one embodiment. In other applications, the forward channel may send data as an orthogonal frequency division multiplex (OFDM) signal. FIG. 6C illustrates frequency slots (or ranges) used in a typical OFDM signal. In OFDM, information may be encoded around a number of frequencies $f1 \ldots fN$, for example. Each frequency may carry a certain number of bits, which may be different for different OFDM encoding schemes. In one embodiment, one or more of the frequency slots may be left empty so that the empty slots may be used for a back or side channel, for example. For example, if the slot around frequency $f1$ is left empty in the forward channel, then the back channel may send control information over frequency $f1$ (e.g., either using OFDM or another encoding scheme). Similarly, if the slot at frequency $f4$ is left empty in the forward channel, then the back channel may send control information over frequency $f4$. In other embodiments, multiple slots may be used for the back channel if higher data rates are desired, for example.

As mentioned above with regard to FIG. 1B, the low frequency backchannel in FIG. 6B or the frequency slots of FIG. 6C may be used to include a channel from both the receiver to transmitter and transmitter to receiver so that control information may be sent in both directions. In some embodiments, the control information sent in different directions may be sent at different times (e.g., time multiplexed). In other embodiments, the control information sent in different directions may be sent on different frequencies (e.g., frequency multiplexed). Advantageously, the control information back or side channel allows the transmitter and receiver to communicate with each other to improve the data transmission process and achieve lower BERs, for example, and optimize the speed and performance of the channel.

Figure 7:
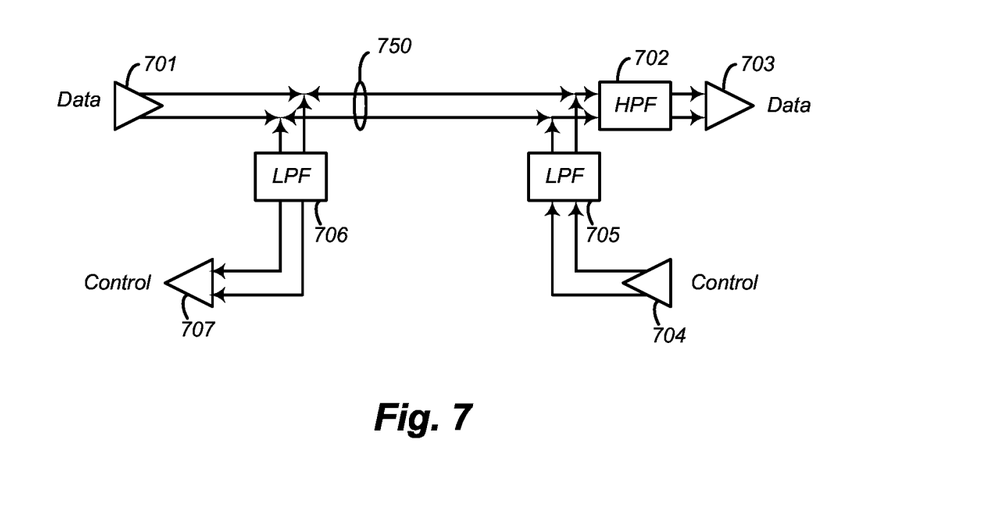
FIG. 7 illustrates an example bidirectional communication channel carrying data and control information according to one embodiment.

FIG. 7 illustrates an example bidirectional wired communication channel carrying data and control information according to one embodiment. The example shown in FIG. 7 may be used in a PAM, OFDM, discrete multi-tone (DMT), or other encoding applications, for example, where the data signal in the forward channel occupies frequencies above a given frequency, $f1$, and the control information in the back or side channels occupies frequencies below the given frequency, $f1$, where $f1$ may be 1 kHz, 10 kHz, up to around 100 kHz, for example. In this example, data signals are driven onto a differential bidirectional wired communication channel 750 by a transmitter output stage 701 having differential outputs. Data signals from channel 750 are coupled to differential inputs of receiver input stage 703 through a high pass filter (HPF) 702. The high pass filter 702 is configured to pass frequencies above $f1$ and cut off frequencies below $f1$, for example. Accordingly, data signals pass from the transmitter output stage 701 to the receiver input stage 702. Conversely, control information signals are driven onto the differential bidirectional wired communication channel 750 by a differential auxiliary transmitter output stage 704 through a low pass filter (LPF) 705. Low pass filter 705 is configured to pass frequencies below $f1$ and cut off frequencies above $f1$, for example. Accordingly, channel 750 may carry control information signals at frequencies below $f1$ in one direction and data signals above $f1$ in another direction along the wired channel 750. Control information signals from channel 750 are coupled to differential inputs of auxiliary receiver input stage 707 through a second low pass filter (LPF) 706. The low pass filter 706 is configured to pass frequencies below $f1$ and cut off frequencies above $f1$, for example. In this example, LPF 706 ensures that only the control information signals, and not the data signals, are received in the auxiliary receiver input stage 707. Similarly, HPF 702 ensures that only the data signals, and not the control information signals, are received in receiver input stage 703. LPF 705 may be used to ensure that only control information signals having frequencies below $f1$ are introduced into channel 750 by auxiliary transmitter 704. In some embodiments, a second HPF (not shown) may be used at the output of transmitter 701 to ensure that only data signals having frequencies above $f1$ are introduced into the channel by transmitter output stage 701.

Figure 8:
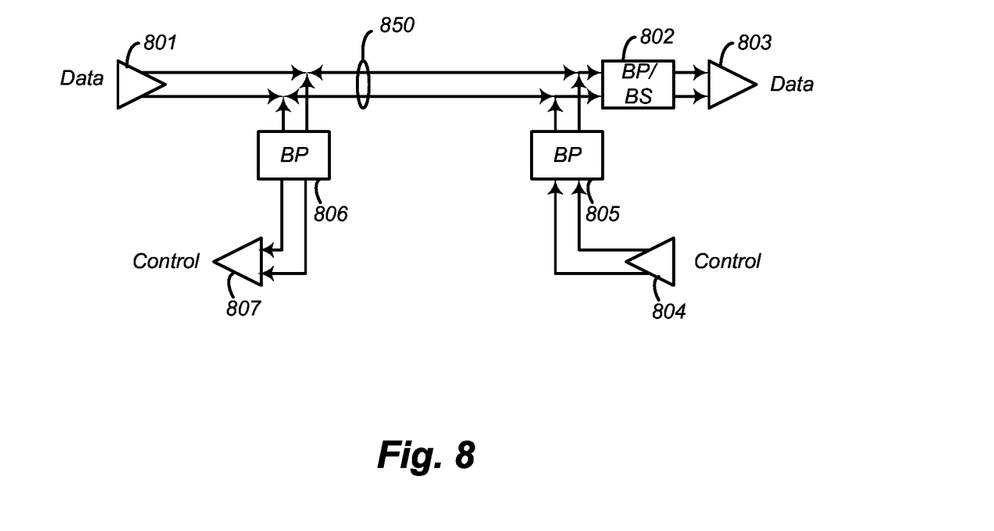
FIG. 8 illustrates another example bidirectional communication channel carrying data and control information according to one embodiment.

FIG. 8 illustrates another example bidirectional wired communication channel 850 carrying data and control information according to one embodiment. In some applications, such as OFDM, the forward channel may leave certain frequency bands (e.g., a slot from frequency $f1$ to frequency $f2$) empty for use by a back channel. Accordingly, the forward channel may couple data signals on frequencies below $f1$ and above $f2$ from transmitter output stage 801, over channel 850, and to receiver input stage 803 through a filter 802. Filter 802 may pass frequencies below $f1$ and above $f2$ and cut off frequencies between $f1$ and $f2$, for example. Filter 802 may include multiple band pass (BP) filters or a band stop (BS) filter, for example. Conversely, control information signals may be sent using frequencies between $f1$ and $f2$ from auxiliary transmitter output stage 804 through a BP filter 805, over the channel 805, through another BP filter 806, and to the input of auxiliary receiver input stage 807. BP filters 804 and 805 are configured to pass frequencies between $f1$ and $f2$ and cut off frequencies below $f1$ and above $f2$. Accordingly, data signals below $f1$ and above $f2$ may be coupled over channel 850 along the forward channel simultaneously with control information signals between $f1$ and $f2$ along the back channel.

Figure 9:
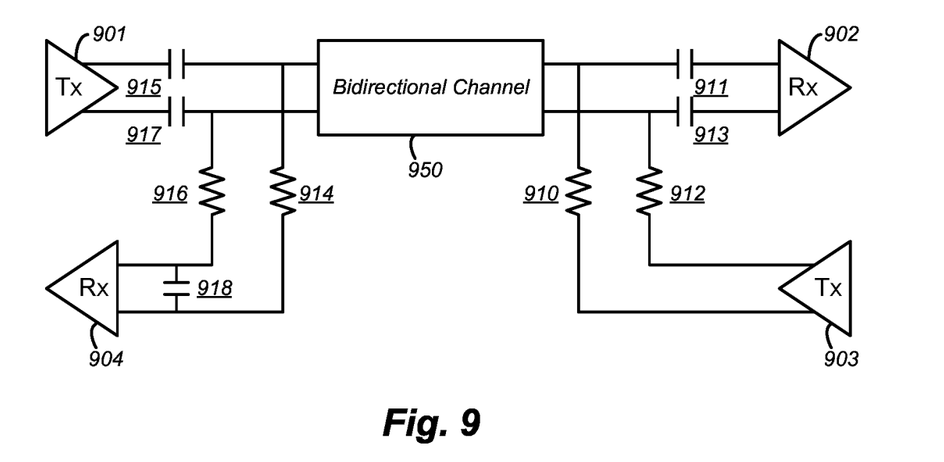
FIG. 9 illustrates example circuit components for a transmitter and/or receiver according to one embodiment.

FIG. 9 illustrates example circuit components for a transmitter and/or receiver according to one embodiment. In this example, a transmitter output stage 901 comprises differential outputs. Each output is coupled through a capacitor 915 and 917 respectively to wires of bidirectional channel 950. Downstream, the two wires of bidirectional channel 950 are coupled to differential inputs of receiver input stage 902 through capacitors 911 and 912. For the back channel, auxiliary TX output stage 903 comprises differential outputs coupled to the wires of channel 950 through resistors 910 and 912. Upstream, the two wires of channel 950 are coupled to inputs of auxiliary RX input stage 904 through resistors 914 and 916. For the forward path, capacitors 911, 913, 915, and 917 pass high frequencies (e.g., above some threshold frequency f1). High frequencies from TX output stage 901 may be filtered by resistors 914 and 916 in combination with a capacitance. The capacitance may be provided by an input capacitance of auxiliary RX input stage 904, which may be a slower input stage and thus using larger input MOS transistors with larger input capacitances. Additionally, or alternatively, a capacitor 918 may be configured between the differential inputs of auxiliary RX input stage 904, for example. For the auxiliary TX back channel, resistor 910 and capacitor 911 form a first LPF and resistor 912 and capacitor 913 form a second LPF.

Figure 10:
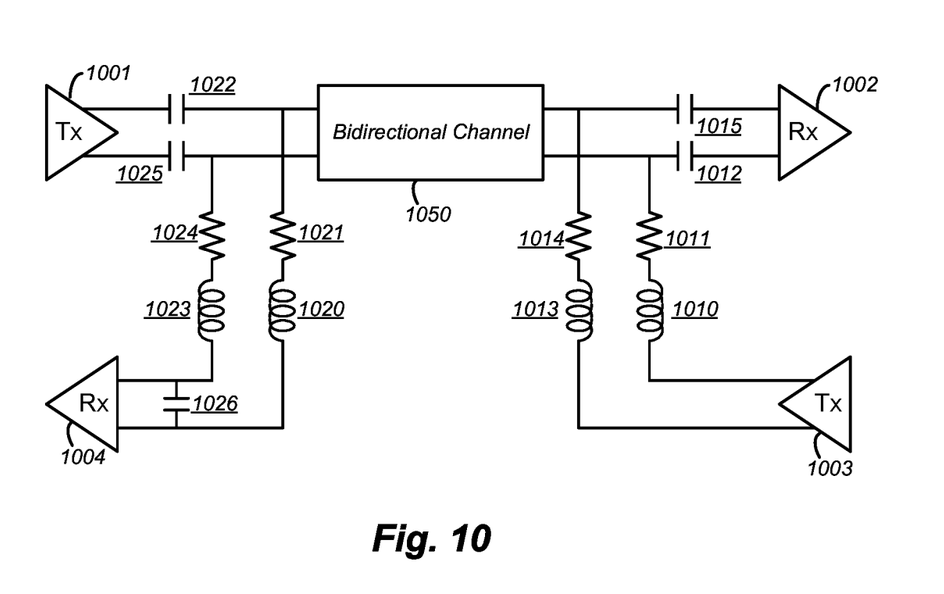
FIG. 10 illustrates another example of circuit components for a transmitter and/or receiver according to one embodiment.

FIG. 10 illustrates another example of circuit components for a transmitter and/or receiver according to one embodiment. FIG. 10 illustrates another embodiment similar to FIG. 9, but with the addition of inductors 1023, 1020, 1013, and 1010 in series with resistors 1024, 1021, 1014, and 1011, respectively. Inductors may allow the system to be more finely tuned by increasing the order of the filter than just using R's and C's, which may have advantages in certain applications, for example.

Figure 11A:
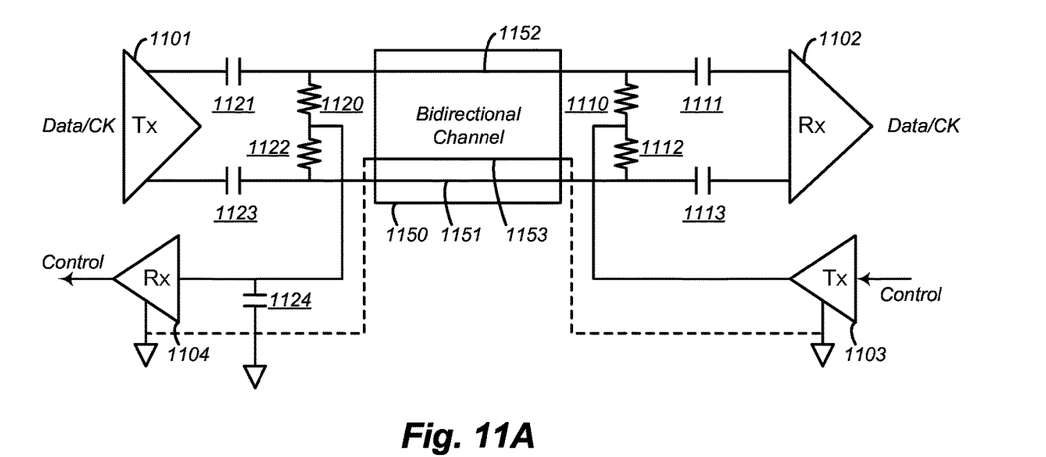
FIG. 11A illustrates another example circuit for a transmitter and/or receiver according to one embodiment.

FIG. 11A illustrates another example circuit for a transmitter and/or receiver according to one embodiment. In one embodiment, the forward channel may be implemented differentially and the back channel may be implemented by modulating a common mode signal. For example, a forward signal, such as data or a clock, may be coupled through a transmitter output stage 1101 onto a differential output. A bidirectional wired data communication channel 1150 may include differential wires 1151 and 1152 coupled to the differential output of transmitter output stage 1101. In this example, the differential output terminals of transmitter output stage 1101 are coupled to the differential wires 1151 and 1152 through capacitors 1121 and 1123. Similarly, receiver input stage 1102 comprises differential inputs coupled to differential wires 1151 and 1152 of channel 1150. In this example, the differential inputs of receiver input stage 1102 are coupled to differential wires 1151 and 1152 through capacitors 1111 and 1112. Accordingly, high frequency data or clock signals may pass from transmitter output stage 1101 to receiver input stage 1102.

However, in this example, control information signals are coupled through auxiliary transmitter 1103 to adjust the common mode voltage on channel 1150. For example, an output of auxiliary TX stage 1103 is coupled to terminals of resistors 1110 and 1112. Terminals of resistors 1110 and 1112 coupled together may form one common mode terminal of channel 1150, for example. The other terminals of resistors 1110 and 1112 are coupled to differential wires 1151 and 1152. Accordingly, the output of auxiliary TX stage 1103 modulates the common mode of channel 1150 with the control information signals. Similarly, auxiliary receiver input stage 1104 has an input coupled to terminals of resistors 1120 and 1122. Terminals of resistors 1120 and 1122 coupled together may form another common mode terminal of channel 1150, for example. The other terminals of resistors 1120 and 1122 are coupled to differential wires 1151 and 1152. Accordingly, common mode control information signals are coupled to the input of auxiliary RX input stage 1104. In some embodiments, bidirectional channel 1150 may include a ground wire 1153. In this case, the ground wire may be coupled to circuit grounds for the auxiliary transmitter 1103 and auxiliary receiver 1104 (shown in dashed lines in FIG. 11A) to more accurately detect common mode signals in the channel, for example. Advantageously, differential circuits in the forward path naturally impede common mode variations, adding an additional degree of separation between the forward channel and back channel. In some embodiments, filters as mentioned above may be implemented using the resistors and capacitors shown. For example, resistor 1110 and capacitor 1111 and resistor 1112 and capacitor 1113 may form RC LPFs for the control information signals from the output of auxiliary TX stage 1103 to channel 1150, while simultaneously forming RC HPFs for the differential data signals from channel 1150 to the input of RX 1102, for example. Similarly, resistors 1120 and 1122 may form an LPF with a capacitance 1124 at the input of auxiliary RX stage 1104, for example. Further, the order of the filter may be increased by including an inductor (not shown) in series with each resistor 1120 and 1122 and/or 1110 and 1112, for example. As mentioned above, some or all of components 1110-1113 and 1121-1123 may be integrated on the same semiconductor substrate, for example.

Figure 11B:
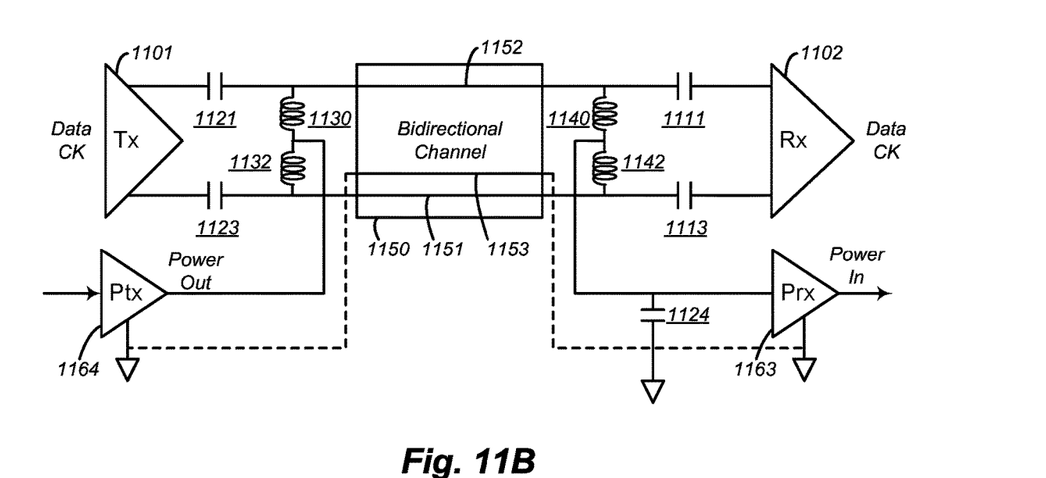
FIG. 11B illustrates another example circuit for a transmitter and/or receiver according to one embodiment.

FIG. 11B illustrates another example circuit for a transmitter and/or receiver according to one embodiment. Features and advantages of some embodiments of the present disclosure may include sending power and high speed information from a transmitter to a receiver, for example, or sending high speed information from the transmitter to a receiver and power from the receiver to the transmitter, for example. In this example, a power transmitter 1164 generates a power output signal. The power output signal may, for example, transmit power at particular frequencies (e.g., DC or low frequency bands or across a range of frequencies). In this example, the power output signal is coupled over the channel as a common mode signal through inductors 1130 and 1132. The common mode power signal may be carried on wires 1151 and 1152, for example, relative to a ground wire 1153. Inductors 1140 and 1142 couple the common mode power signal to the input of a power receiver 1163 to provide power to a receiver system, for example. Inductors 1130, 1132, 1140, and 1142 act as open circuits to the high frequency data or clock signals from the transmitter to the receiver, for example, and may pass low frequency power signals. It is to be understood that in other embodiments, the power transmitter 1164 may be on a receiver system and the power receiver 1163 may be on a transmitter system, for example, so that power flows in the other direction. Additionally, control information may be sent in either direction with power (e.g., at different frequencies) using the techniques described above.

Figure 12:
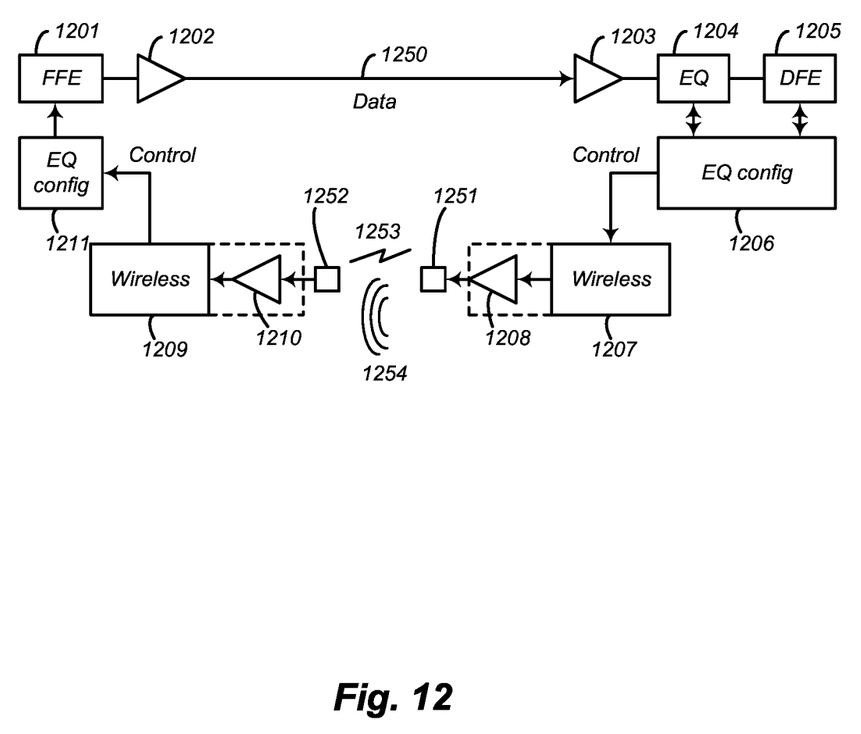
FIG. 12 illustrates yet another example system for a transmitter and/or receiver according to one embodiment.

FIG. 12 illustrates yet another example system for a transmitter and/or receiver according to one embodiment. In some embodiments, data may be communicated over a wired channel, while control information may be communicated wirelessly (e.g., over a wireless back channel). This example shows optimizing one data channel using coefficients sent over a wireless back channel. However, it is to be understood that a greater number of data channels may be configured using one or more wireless back channels for the control information. Here, an equalizer 1204 and DFE 1205 are monitored and an equalizer configuration circuit 1206 may generate control information for an upstream FFE 1201. The control information may be sent to a wireless transmitter 1207 comprising a wireless transmitter output stage 1208 coupled to a wireless transmission element 1251, for example. The control information may be sent wirelessly from wireless transmission element 1251 to wireless receiver element 1252. Wireless elements 1251 and 1252 may include, for example, antennas for sending data using RF signals 1253 or magnetic coils for sending data using magnetic signals 1254, for example. Element 1252 is coupled to a wireless receiver input stage 1210, which is part of a wireless receiver system 1209. Wireless receiver 1209 sends the control information to an equalizer configuration circuit 1211, which in turn configures FFE 1201 to optimize transmission over a wired communication channel 1250. As mentioned above, control information for multiple wired channels may be sent over a wireless back channel as described above. One wireless system may be part of one server, for example, and another wireless system may be part of another server so that the servers can communicate large amounts of data over multiple wired communication channels 1250 and configure each communication channel for optimum performance using control information received over a wireless backchannel, for example. In yet other embodiments, wireless signals may be used to send control information from the transmitter to the receiver as mentioned above.

Figure 13:
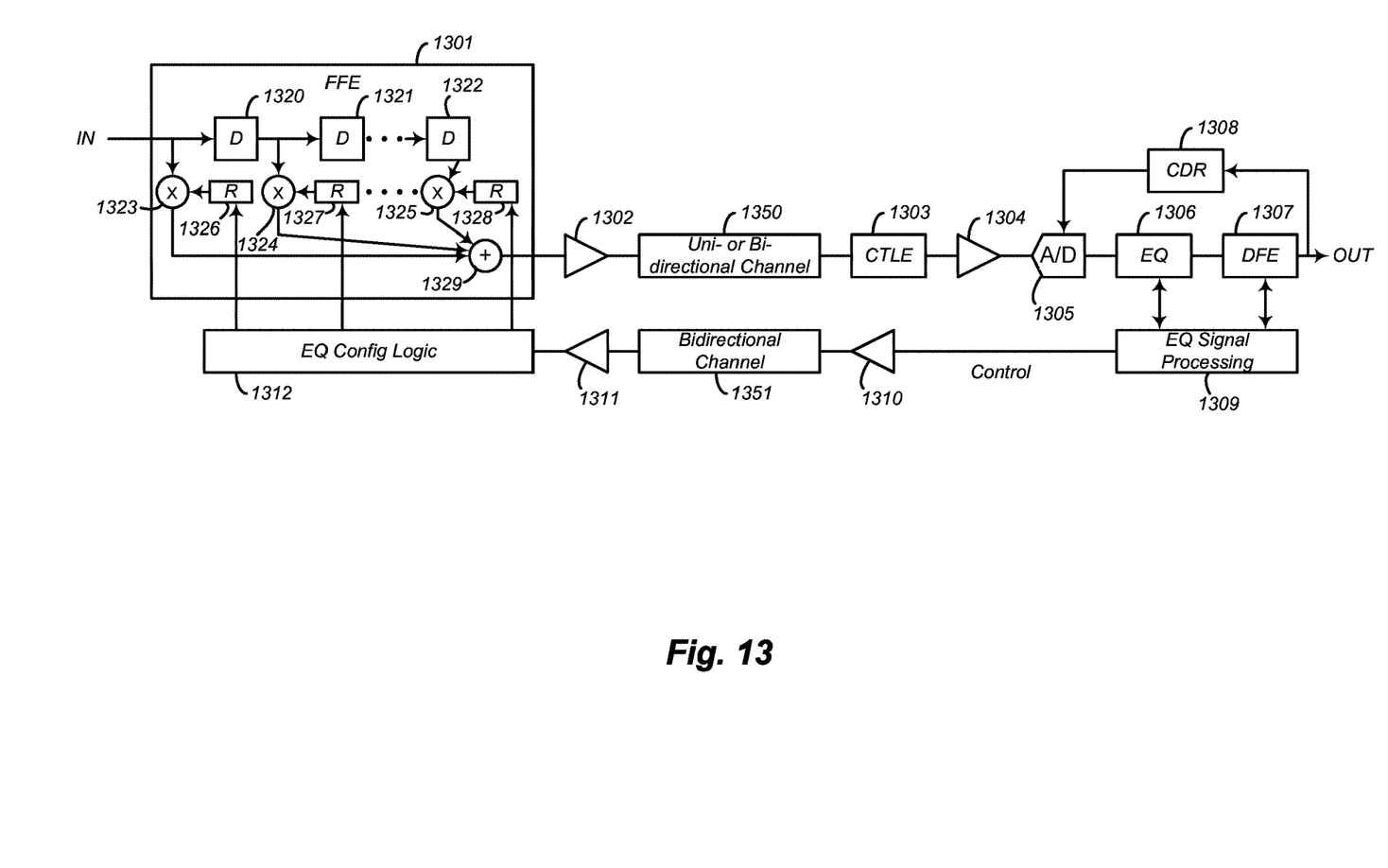
FIG. 13 illustrates an example of control information from a receiver used to configure a transmitter according to one embodiment.

FIG. 13 illustrates an example of control information from a receiver used to configure a transmitter according to one embodiment. In one embodiment, the control information may comprise filter coefficients for configuring an FFE in a transmitter. For example, data may be received at the input of FFE circuit 1301, and the output of FFE, 1301 coupled to a transmitter output stage 1302. Throughout the above specification, additional well known transmitter blocks are not shown for illustrative purposes. Transmitter output stage 1302 drives the data signals onto either a unidirectional or bidirectional wired channel 1350. A receiver may include a continuous time linear equalizer (CTLE) 1303 and a receiver input stage 1304 configured in series, an example of which is illustrated here. As mentioned above, data may be on a bidirectional channel in some embodiments, where the back channel is shared with the forward data channel, or in other embodiments the data may be on a unidirectional channel and the back channel is shared with a clock on another bidirectional channel, for example. The receiver may further include an analog to digital converter (A/D) 1305, equalizer circuit 1306, DFE 1307, and clock data recovery circuit 1308, for example, to produce output data.

In this example, EQ signal processing circuit 1309 coordinates equalization of EQ 1306, DFE 1307, and FFE 1301. Circuit 1309 may generate filter coefficients for FFE 1301 to achieve improved performance of the channel and send the coefficients as control information across a bidirectional channel 1351, which may be shared with data or a clock, for example. Auxiliary transmitter output stage 1310 drives signals holding the filter coefficients onto channel 1351, and auxiliary receiver input stage 1311 receives the signals from channel 1351. The coefficients are extracted from the back channel signal and EQ config logic 1312 configures FFE 1301 with the filter coefficients. In this example, FFE 1301 may comprise delay circuits 1320-1322, multipliers 1323-1325, and a summer circuit 1329, for example. Multipliers 1323-1325 may be controlled by digital values in coefficient registers 1326-1328, for example, which may be part of FFE 1301 in some embodiments. Accordingly, FFE 1301 may be configured to optimize transmission in coordination with downstream EQ circuit 1306 and/or DFE 1307, for example, to increase the data transmission rate of the channel.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A wireline data communications system comprising:
a transmitter, the transmitter comprising:
one or more transmitter output stages coupled to one or more wired communication channels; and
an auxiliary receiver input stage coupled to a first one of the one or more wired communication channels, wherein the first one of the one or more wired communication channels is a bidirectional wired communication channel; and
a receiver, the receiver comprising:
one or more first receiver input stages coupled to the one or more wired communication channels; and
an auxiliary transmitter output stage coupled to the bidirectional wired communication channel,
wherein the bidirectional wired communication channel couples first data or a clock from a first transmitter output stage of the one or more transmitter output stages to a first receiver input stage of the one or more receiver input stages, and wherein the bidirectional wired communication channel couples control information for configuring the transmitter from the auxiliary transmitter output stage to the auxiliary receiver input stage;
wherein the first data or the clock are coupled over the bidirectional wired communications channel across a first range of frequencies, and wherein the control information is coupled over the bidirectional wired communications channel using a second range of frequencies that do not overlap the first range of frequencies.

2. The data communications system of claim 1, the transmitter further comprising an auxiliary transmitter output stage coupled to the bidirectional wired communication channel, and the receiver further comprising an auxiliary receiver input stage coupled to the bidirectional wired communication channel, wherein the bidirectional wired communication channel further couples control information for configuring the receiver from the auxiliary transmitter output stage to the auxiliary receiver input stage.

3. The data communications system of claim 1, wherein one or more bits are coupled from the transmitter to the receiver between one of the one or more transmitter output stages to one of the one or more first receiver input stages and further between the auxiliary transmitter output stage to the auxiliary receiver input stage to correct distortion between said one of the one or more transmitter output stages and one of the one or more first receiver input stages.

4. The data communications system of claim 1, the transmitter comprising a first transmitter output stage coupled to the bidirectional wired communication channel to send the first data, the receiver comprising a first receiver input stage coupled to the bidirectional wired communication channel to receive the first data.

5. The data communications system of claim 1, the transmitter comprising a first transmitter output stage coupled to the bidirectional wired communication channel to send the clock, the receiver comprising a first receiver input stage coupled to the bidirectional wired communication channel to receive the clock.

6. The data communications system of claim 5, the transmitter comprising a second transmitter output stage coupled to a second one of the one or more wired communication channels to send the first data, the receiver comprising a second receiver input stage coupled to the second one of the one or more wired communication channels to receive the first data.

7. The data communications system of claim 1 wherein the control information comprises channel equalization information.

8. The data communications system of claim 1 wherein the control information comprises digital filter coefficients.

9. The data communications system of claim 1 wherein the bidirectional wired communication channel couples the first data or the clock and the control information during the same time period.

10. The data communications system of claim 1 wherein the second range of frequencies is less than the first range of frequencies.

11. The data communications system of claim 1 wherein the second range of frequencies is near, in frequency, to zero frequency, and wherein the first range of frequencies is greater than the second range of frequencies.

12. The data communications system of claim 1 wherein the one or more wired communication channels comprise wired differential conductors.

13. The data communications system of claim 12 wherein the wired differential conductors have a length in the range of 1 mm to 50 cm.

14. The data communications system of claim 1 further comprising:
a first filter coupled to the output of the auxiliary transmitter output stage; and
a second filter coupled to the output of the auxiliary receiver input stage.

15. The data communications system of claim 1 wherein the one or more transmitter output stages and the one or more receiver input stages are differential stages, and wherein the auxiliary transmitter output stage and the auxiliary receiver input stage are coupled to common mode terminals of the bidirectional wired data communication channel.

16. A wireline data communications system comprising:
a transmitter, the transmitter comprising:
one or more transmitter output stages coupled to one or more wired communication channels; and
an auxiliary receiver input stage coupled to a first one of the one or more wired communication channels,
wherein the first one of the one or more wired communication channels is a bidirectional wired communication channel; and
a receiver, the receiver comprising:
one or more first receiver input stages coupled to the one or more wired communication channels; and
an auxiliary transmitter output stage coupled to the bidirectional wired communication channel,
wherein the bidirectional wired communication channel couples first data or a clock from a first transmitter output stage of the one or more transmitter output stages to a first receiver input stage of the one or more receiver input stages, and wherein the bidirectional wired communication channel couples control information for configuring the transmitter from the auxiliary transmitter output stage to the auxiliary receiver input stage;
wherein the one or more transmitter output stages and the one or more receiver input stages are differential stages, and wherein the auxiliary transmitter output stage and the auxiliary receiver input stage are coupled to common mode terminals of the bidirectional wired data communication channel.

17. The data communications system of claim 16, the transmitter further comprising an auxiliary transmitter output stage coupled to the bidirectional wired communication channel, and the receiver further comprising an auxiliary receiver input stage coupled to the bidirectional wired communication channel, wherein the bidirectional wired communication channel further couples control information for configuring the receiver from the auxiliary transmitter output stage to the auxiliary receiver input stage.

18. The data communications system of claim 16, wherein one or more bits are coupled from the transmitter to the receiver between one of the one or more transmitter output stages to one of the one or more first receiver input stages and further between the auxiliary transmitter output stage to the auxiliary receiver input stage to correct distortion between said one of the one or more transmitter output stages and one of the one or more first receiver input stages.

19. The data communications system of claim 16, the transmitter comprising a first transmitter output stage coupled to the bidirectional wired communication channel to send the clock, the receiver comprising a first receiver input stage coupled to the bidirectional wired communication channel to receive the clock, the transmitter comprising a second transmitter output stage coupled to a second one of the one or more wired communication channels to send the first data, the receiver comprising a second receiver input stage coupled to the second one of the one or more wired communication channels to receive the first data.

20. A wireline data communications system comprising:
a transmitter, the transmitter comprising:
one or more transmitter output stages coupled to one or more wired communication channels; and
an auxiliary receiver input stage coupled to a first one of the one or more wired communication channels,
wherein the first one of the one or more wired communication channels is a bidirectional wired communication channel; and
a receiver, the receiver comprising:
one or more first receiver input stages coupled to the one or more wired communication channels; and
an auxiliary transmitter output stage coupled to the bidirectional wired communication channel,
wherein the bidirectional wired communication channel couples first data or a clock from a first transmitter output stage of the one or more transmitter output stages to a first receiver input stage of the one or more receiver input stages, and wherein the bidirectional wired communication channel couples control information for configuring the transmitter from the auxiliary transmitter output stage to the auxiliary receiver input stage; and
wherein the first data or the clock are coupled over the bidirectional wired communication channel at a first data rate, and wherein the control information is coupled over the bidirectional wired communication channel at a second data rate less than the first data rate.

* * * * *